United States Patent [19]

Fukuda

[11] Patent Number: 4,911,474
[45] Date of Patent: Mar. 27, 1990

[54] MOTORCYCLE FRAME

[75] Inventor: Tadashi Fukuda, Iwata, Japan

[73] Assignee: Yamaha Hatsudoki Kabushiki Kaisha, Iwata, Japan

[21] Appl. No.: 176,931

[22] Filed: Apr. 4, 1988

[51] Int. Cl.$^4$ ............................................. B62J 35/00
[52] U.S. Cl. ..................................... 280/835; 180/219
[58] Field of Search .................... 180/219; 280/281 R, 280/5 A, 835, 281.1; 297/217

[56] References Cited

U.S. PATENT DOCUMENTS 4,727,953 3/1988 Kudo et al. ........................ 180/219

Primary Examiner—John A. Pekar
Attorney, Agent, or Firm—Ernest A. Beutler

[57] ABSTRACT

A light weight, low center of gravity motorcycle having a frame assembly comprised of a main frame member that extends rearwardly and downwardly to a rear wheel support and upwardly extending portion that defines a recess adapted to support the fuel tank. The recess has sufficient volume so as to provide a large volume of the fuel tank in this area to minimize the changes in center of gravity as fuel is consumed from the tank. A seat rail assembly is affixed to this upwardly extending portion for supporting a seat and contains an integral lubricant tank that forms a structural element of the seat rail assembly.

6 Claims, 3 Drawing Sheets

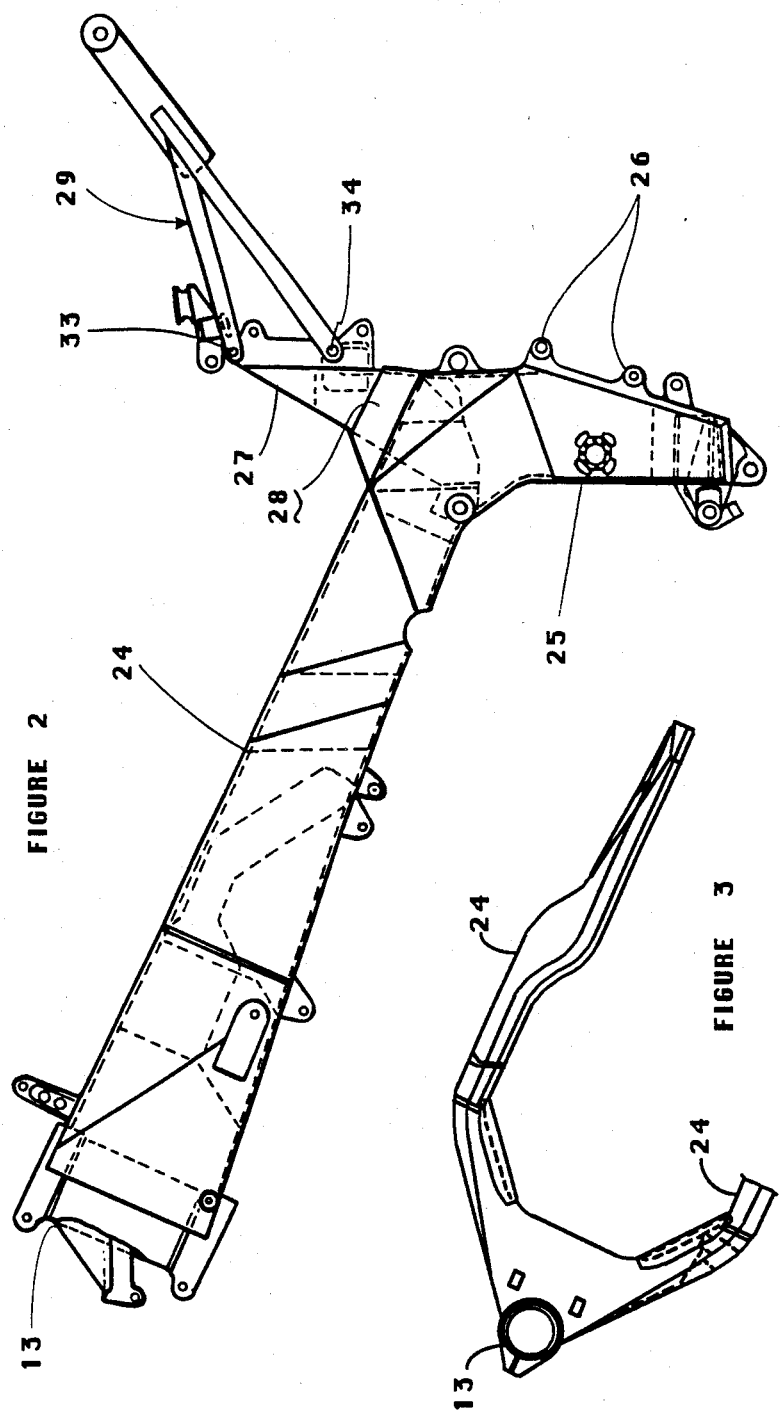

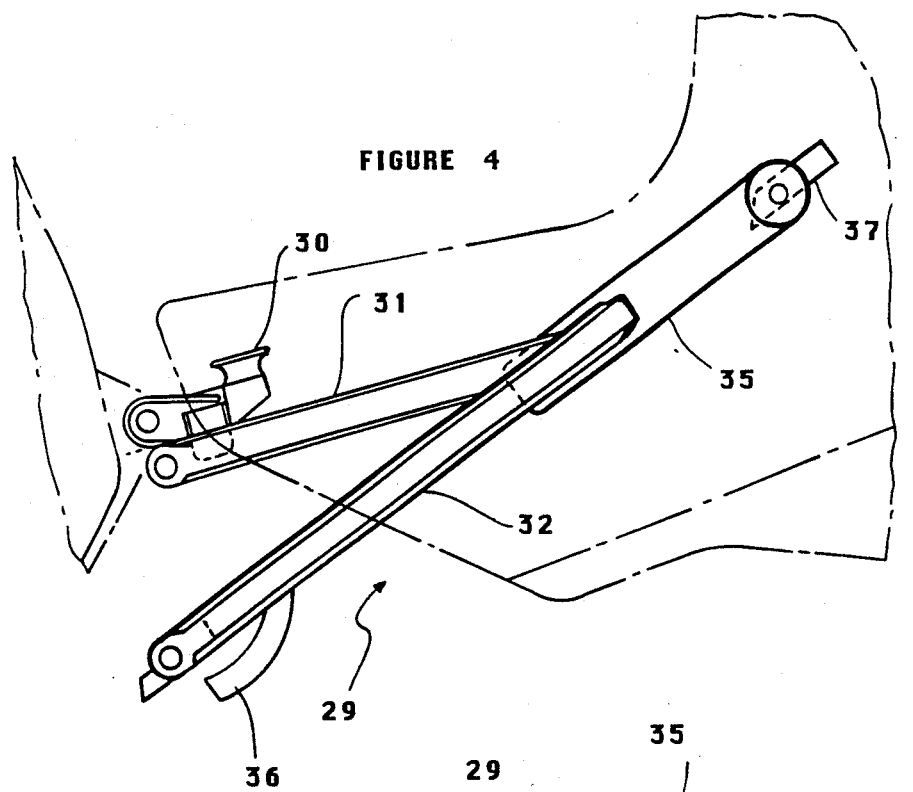
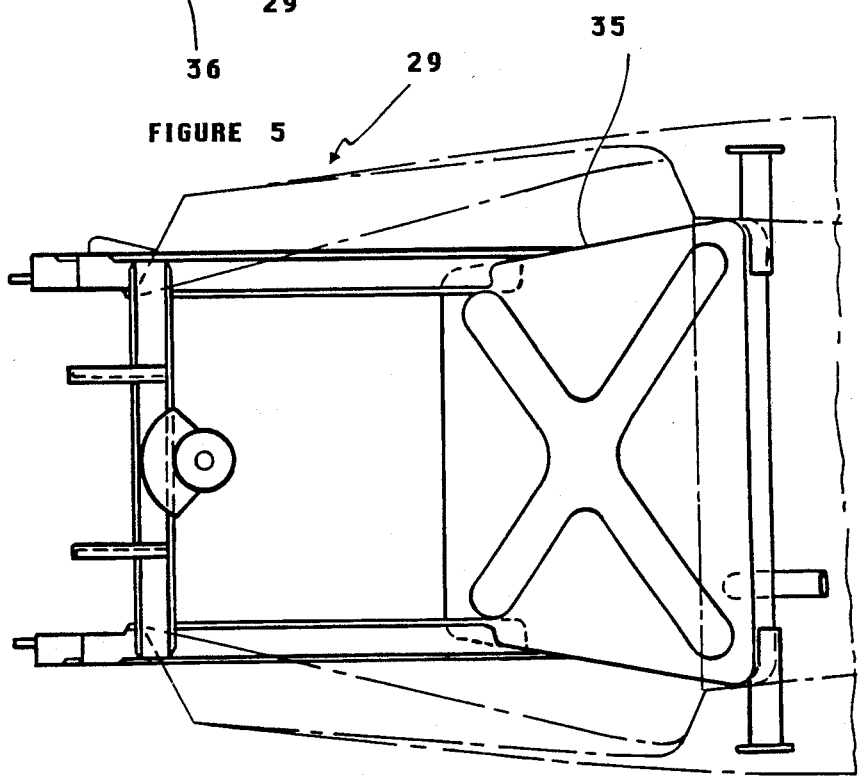

MOTORCYCLE FRAME

BACKGROUND OF THE INVENTION

This invention relates to a motorcycle frame and more particularly to an improved light weight, high strength frame that provides a low center of gravity.

In connection with the design and construction of motorcycles, it is the normal practice to employ a frame, which is a generally welded up assembly, and which supports the major structural components of the motorcycle such as the engine transmission, front and rear wheels, engine accessories including the fuel tank and the seat. Obviously, the frame of a motorcycle is called upon to do a wide variety of functions while, at the same time, providing a light weight and easily manufactured construction that will facilitate servicing of the components. With normal motorcycle practice, the frame is comprised of a main frame member that supports the head pipe at its front end for dirigibly supporting the front wheel and which extends rearwardly and supports the seat at its rear end. The engine is normally positioned below this main frame member and the fuel tank is positioned above the main frame member. As a result, the fuel tank tends to be rather highly placed in the frame and the center of gravity is, therefore, raised to an amount that may become objectionable. This problem is also particularly acute since the center of gravity will shift considerably as the fuel in the tank is consumed and thus will change the handling of the motorcycle.

It is, therefore, a principal object of this invention to provide an improved, light weight, high strength frame assembly that facilitates lowering of the center of gravity.

It is a further object of this invention to provide a frame assembly that will accommodate a fuel tank and rider's seat in an appropriate fashion while, at the same time, maintaining a low center of gravity.

In connection with motorcycles of the type aforedescribed, it is frequently the practice to employ a remotely positioned lubricant tank for the engine lubricant which serves the combined function of containing an amount of lubricant and also of separating lubricant from crankcase gases so as to avoid frothing in the lubricant. Of course, the compact construction of a motorcycle, as aforedescribed, further adds to the difficulties of providing such remote lubricant tanks.

It is, therefore, a further object of this invention to provide an improved frame and lubricant tank construction wherein the lubricant tank can be remotely positioned from the engine and adds to the structural integrity of the overall assembly.

SUMMARY OF THE INVENTION

A first feature of this invention is adapted to be embodied in a frame construction for motorcycles having a head pipe adapted to journal a front wheel for steering movement and a main frame element extending rearwardly and downwardly from the head pipe and terminating at a means for suspending a rear wheel. In accordance with this feature of the invention, the frame means includes an upwardly extending portion fixed at the rear end of the main frame element and defining a recess for accommodating a portion of a fuel tank suspended upon the main frame element. Seat support means are fixed to and extend rearwardly from the frame upwardly extending portion for supporting a seat.

Another feature of the invention is also adapted to be embodied in a motorcycle having a head pipe, a main frame member affixed to the head pipe and extending rearwardly therefrom, a front wheel dirigibly supported by the head pipe and a rear wheel supported by the frame. An engine is also supported by the frame for driving the rear wheel and a seat rail is affixed to the main frame member and extends rearwardly therefrom. A seat is carried at least in part by the seat rail and an oil tank is carried by the seat rail for containing lubricant for the engine and also for reinforcing the seat rail.

BRIEF DESCRIPTION OF THE DRAWINGS

FIG. 2 is a side elevational view showing the frame assembly.

FIG. 3 is a top plan view showing the forward portion of the frame assembly.

FIG. 4 is an enlarged side elevational view showing the rear portion of the frame assembly and the seat rails thereof.

FIG. 5 is a top plan view of the construction shown in FIG. 4.

DETAILED DESCRIPTION OF THE PREFERRED EMBODIMENT OF THE INVENTION

Figure 1:
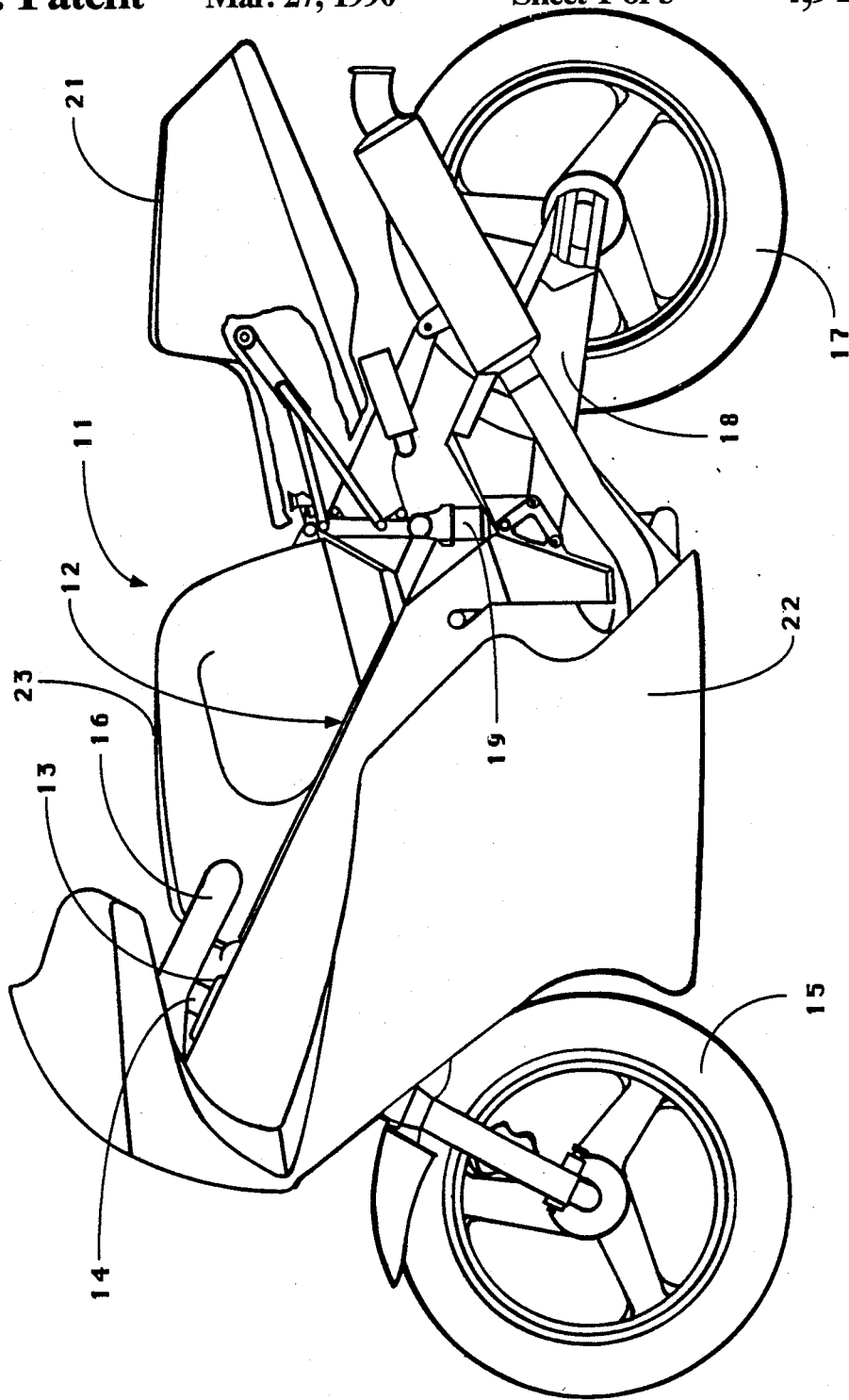
FIG. 1 is a side elevational view of a motorcycle embodying a frame constructed in accordance with an embodiment of the invention.

Referring first to FIG. 1, a motorcycle constructed in accordance with an embodiment of this invention is identified generally by the reference numeral 11. The motorcycle 11 includes a frame assembly, indicated generally by the reference numeral 12 and constructed in accordance with the invention. The frame assembly 12 includes a head pipe 13 that dirigibly supports a front fork assembly 14. A front wheel 15 is carried by the front fork assembly 14 in a known manner. The front wheel 15 and front fork 14 are steered by a handlebar assembly 16 that is positioned at the upper end of the front fork assembly 14 in close proximity to the head pipe 13 to maintain a low profile and low center of gravity.

A rear wheel 17 is supported for suspension movement relative to the frame assembly by means of a rear suspension of a suitable type which includes a trailing arm 18. The trailing arm 18 is pivotally supported on a suspension assembly 19 that is carried at the rear end of the frame 12. A seat 21 is supported over the rear wheel 17 by the frame assembly 12 in a manner to be described.

An engine transmission assembly, which does not appear in the drawings because it is obscured by a body cowling 22, is supported in the frame assembly 12 in a suitable manner and drives the rear wheel 17. A fuel tank 23 is supported on the main frame assembly 12 above the engine and supplies fuel to it. The fuel tank 23 is disposed between the handlebar 16 and the seat 21.

The overall configuration of the motorcycle 11 as thus far described and its general components may take any known form and, for that reason, details of the running components are not believed to be necessary to understand the construction and operation of the invention. However, the invention does deal with the frame assembly 12 and its cooperation with certain components, including the fuel tank 23 and the construction of the frame assembly 12 will on be described in further detail by partiuclar reference to FIGS. 2 through 5.

As has been noted, the frame assembly 12 includes a head pipe 13. The head pipe 13 is supported by a pair of main frame members 24 that are affixed at their forward ends to the head pipe 13 and which diverge rearwardly therefrom and extend along opposite sides of the frame assembly as best shown in FIG. 3. The main frame members 24 and head pipe 13 are formed preferably from a fabrication of aluminum stampings or forgings that are welded together. It should be noted that the main frame members 24 incline rather steeply in a downward direction in order to provide a low center of gravity. At their rear ends, the main frame members are affixed to suspension mounts 25 that extend in a generally vertical direction and which afford a means of attachment 26 for the rear suspension assembly 19.

Unlike conventional motorcycle frames, there is also provided an upwardly extending seat pillar 27 that is generally aligned with the suspension bracket 25 and which extends a substantial distance upwardly from the rearward portion of the main frame member 24 so as to define a recess 28. It should be noted that the fuel tank 23 is supported upon the main frame members 24 and seat pillar 27 so that its rearward end extends into the recess 28. This provides not only a low center of gravity but also ensures that a large portion of the internal volume of the fuel tank 23 will be positioned at a low point within the recess 28. As a result, the center of gravity will not shift as much as with conventional structures when the fuel in the tank 23 is depleted and thus the handling of the motorcycle will be more predictable as the fuel load is consumed.

A seat rail assembly, indicated generally by the reference numeral 29 and shown in most detail in FIGS. 4 and 5 is supported at the rearward end of the seat pillar 27 for supporting the seat 21 by means including a bracket 30. The seat rail 29 includes a pair of angularly disposed members 31 and 32 formed at each side thereof. The forward ends of the members 31 and 32 are bolted to attachment points 33 and 34 formed on the seat pillar 27. The rear ends of the rails 31 and 32 are affixed to each other and to a lubricant tank 35 that spans the area between the members 31 and 32 at the opposite sides of the seat rail assembly 29. As a result, the lubricant tank 35 provides a reinforcement for the rail assembly 29 and provides a rigid support for the seat 21.

Lubricant is delivered to and from the tank 35 from the engine lubricating system in a known manner. This lubricant delivery system may include conduits that are formed in the rail members 31 and 32 including a fitting 36 and a fill pipe 37. The lubricant tank 35 stores the lubricant and also assists in separating gas from the crankcase blow by from the lubricant to prevent frothing in the lubricant system.

It should be readily apparent from the foregoing description that an extremely rigid, light weight and low center of gravity is possible by way of the aforedescribed frame construction and its cooperation with the fuel tank. In addition, this low center of gravity is configured in such a way that the center of gravity does not change significantly as fuel in the fuel tank is depleted.

The foregoing description is that of a preferred embodiment of the invention and various changes and modifications may be made without departing from the spirit and scope of the invention as defined by the appended claims.

I claim:

1. In a frame construction for a motorcycle having a head pipe adpated to journal a front wheel for steering movement, a main frame element extending rearwardly and downwardly from said head pipe and terminating at a means for suspending a rear wheel, the improvement comprising said frame including an upwardly extending portion fixed at the rear end of said main frame element and defining with said rear end of said main frame element a recess into which a portion of a fuel tank suspended upon said main frame element extends, and a seat support means fixed to and extending rearwardly from said frame upwardly extending portion for supporting a seat.

2. In a frame construction for a motorcycle having a head pipe adapted to journal a front wheel for steering movement, a main frame element extending rearwardly and downwardly from said head pipe and terminating at a means for suspending a rear wheel, the improvement comprising said frame including an upwardly extending portion fixed at the rear end of said main frame element and defining a recess a portion of a fuel tank suspended upon said main frame element, and a seat support means fixed to and extending rearwardly from said frame upwardly extending portion for supporting a seat, said recess and fuel tank being configured so that a large portion of the fuel tank volume is contained within said recess for reducing the change in height of center of gravity of the motorcycle as fuel is consumed from the fuel tank.

3. In a frame construction for a motorcycle having a head pipe adapted to journal a front wheel for steering movement, a main frame element extending rearwardly and downwardly from said head pipe and terminating at a means for suspending a rear wheel, the improvement comprising said frame including an upwardly extending portion fixed at the rear end of said main frame element and defining a recess a portion of a fuel tank suspended upon said main frame element, and a seat support means fixed to and extending rearwardly from said frame upwardly extending portion for supporting a seat, said seat support means comprising a seat rail assembly affixed to and extending rearwardly from the rearward portion of said upwardly extending frame portion.

4. In a frame construction as set forth in claim 3 further including a lubricant tank fixed to and forming a structural part of the seat rail.

5. A frame and fuel tank support arrangement for a motorcycle comprised of a frame having a head pipe adapted to journal a front wheel for steering movement, a main frame element extending rearwardly and downwardly from said head pipe and terminating at a means for suspending a rear wheel, the improvement comprising said frame including an upwardly extending portion formed at the rear end of said main frame elementn and defining a recess adapted to accommodate a portion of a fuel tank, said main frame element and said upwardly extending portion having parts extending at an angle to each other and providing means for engagement with said fuel tank for supporting said fuel tank upon said frame, and affixing means carried by said upwardly extending portion and said main frame element for detachably affixing said fuel tank to said frame.

6. A motorcycle comprised of a frame having a headpipe, a main frame member affixed to said head pipe and extending rearwardly therefrom, a front wheel dirigibly supported by said head pipe, a rear wheel suspended from said frame, an engine supported by said frame for driving said rear wheel, a seat rail affixed to said main frame member and extending rearwardly therefrom, a seat carried at least in part by said seat rail, and an oil tank carried by said seat rail for containing lubricant for said engine and forming a structural element of said seat rail.

* * * * *